United States Patent
Huang et al.

(10) Patent No.: US 11,451,648 B2
(45) Date of Patent: *Sep. 20, 2022

(54) MULTIMEDIA COMMUNICATION BRIDGE

(71) Applicant: Lattice Semiconductor Corporation, Hillsboro, OR (US)

(72) Inventors: Jiong Huang, Sunnyvale, CA (US); Henry Tso, Sunnyvale, CA (US); Hoon Choi, Mountain View, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/831,818

(22) Filed: Mar. 27, 2020

(65) Prior Publication Data

US 2020/0236200 A1    Jul. 23, 2020

Related U.S. Application Data

(63) Continuation of application No. 15/876,902, filed on Jan. 22, 2018, now Pat. No. 10,645,199.

(51) Int. Cl.
*H04L 69/08* (2022.01)
*H04L 69/18* (2022.01)
(Continued)

(52) U.S. Cl.
CPC ............. *H04L 69/08* (2013.01); *H04L 69/14* (2013.01); *H04L 69/18* (2013.01); *H04L 69/22* (2013.01); *H04L 69/28* (2013.01)

(58) Field of Classification Search
CPC ......... H04L 69/08; H04L 69/22; H04L 69/28; H04L 69/14; H04L 69/18
See application file for complete search history.

(56) References Cited

U.S. PATENT DOCUMENTS 8,923,326 B2    12/2014  Tang et al.
9,510,045 B2    11/2016  Smith et al.
(Continued)

FOREIGN PATENT DOCUMENTS

| CN | 101076130 A | 11/2007 |
| CN | 103947183 A | 7/2014 |
| CN | 105052137 A | 11/2015 |

OTHER PUBLICATIONS

PCT International Search Report and Written Opinion, PCT Application No. PCT/US2019/014356, dated May 8, 2019, 11 pages.
(Continued)

*Primary Examiner* — Rina C Pancholi
(74) *Attorney, Agent, or Firm* — Haynes and Boone, LLP

(57) ABSTRACT

A bridge chip receives a first data stream compliant with the first multimedia communication standard. The first data stream includes first video data of a first incoming video frame, second video data of a second incoming video frame, and information describing a transfer function for the second video data, the information included in a video blanking interval of the first incoming video frame. The bridge chip extracts information describing a transfer function for the second video data. The bridge chip then generates a second data stream compliant with the second multimedia communication standard. The second data stream includes the first video data in a first outbound video frame, the second video data in a second outbound video frame, and the extracted information describing the transfer function for the second video data. Finally, the generated second data stream is transmitted to a destination device.

20 Claims, 9 Drawing Sheets

(51) Int. Cl.
*H04L 69/22* (2022.01)
*H04L 69/28* (2022.01)
*H04L 69/14* (2022.01)

(56) References Cited

U.S. PATENT DOCUMENTS

| | | | | |
|---|---|---|---|---|
| 9,769,417 | B1* | 9/2017 | Yarygin | H04N 21/434 |
| 2001/0007568 | A1* | 7/2001 | Morris | G11B 27/3027 |
| | | | | 370/473 |
| 2009/0178097 | A1* | 7/2009 | Kim | G06F 13/4072 |
| | | | | 725/114 |
| 2009/0300698 | A1* | 12/2009 | Quigley | H04N 21/4621 |
| | | | | 725/114 |
| 2011/0150006 | A1 | 6/2011 | Unkel et al. | |
| 2015/0015782 | A1 | 1/2015 | Yeh et al. | |
| 2016/0241829 | A1 | 8/2016 | Qu et al. | |
| 2016/0277792 | A1 | 9/2016 | Oh et al. | |
| 2016/0330513 | A1* | 11/2016 | Toma | H04N 9/8205 |
| 2016/0366470 | A1* | 12/2016 | Rabii | H04N 21/440218 |
| 2018/0102106 | A1* | 4/2018 | Shintani | H04N 21/8456 |

OTHER PUBLICATIONS

United States Office Action, U.S. Appl. No. 15/876,902, dated Aug. 1, 2019, 20 pages.

China National Intellectual Property Administration, Office Action, CN Patent Application No. 201980008857.9, dated Nov. 4, 2020, seven pages.

Tobias, Rob, "HDMI 2.1 Specification Announcement", DVB, Digital Video Broadcasting, C/O EBU—17A Ancienne Route, Aug. 16, 2017, pp. 1-40, Switzerland. https://www.dvb.org/resources/restricted/members/documents/TM/TM5518_Presentation-on-HDMI-21.pdf.

* cited by examiner

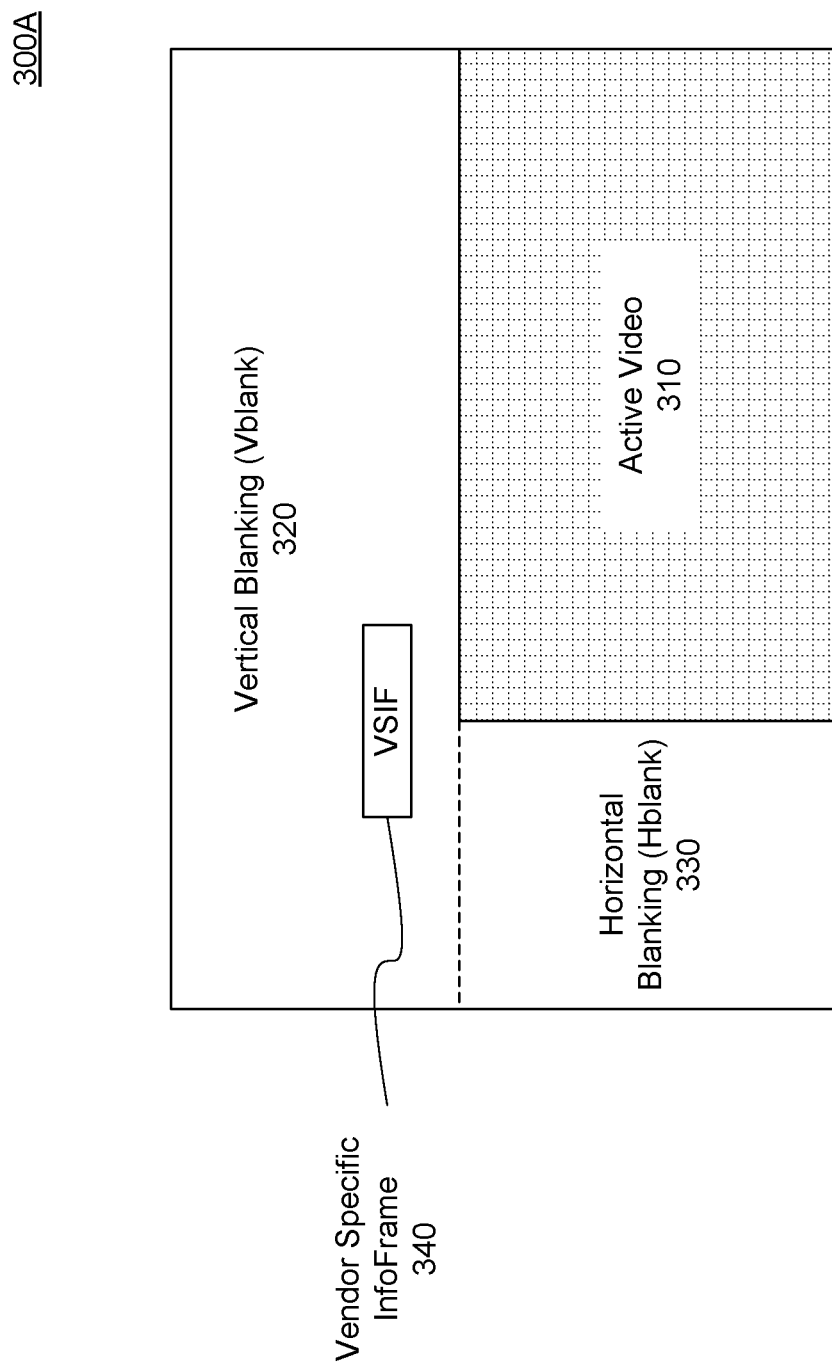

FIG. 4B

|     | 7 | 6 | 5 | 4 | 3 | 2 | 1 | 0 |
| --- | --- | --- | --- | --- | --- | --- | --- | --- |
| HB0 | Packet Type (programmed by customer) ||||||||
| HB1 | Version ||||||||
| HB2 | First | Last | OUI | Length ||||||

FIG. 4C

|     | 7 | 6 | 5 | 4 | 3 | 2 | 1 | 0 |
| --- | --- | --- | --- | --- | --- | --- | --- | --- |
| HB0 | 0 | 1 | 1 | 1 | 1 | 1 | 1 | 1 |
| HB1 | First | Last | Rsvd(0) | Rsvd(0) | Rsvd(0) | Rsvd(0) | Rsvd(0) | Rsvd(0) |
| HB2 | Sequence_Index ||||||||

MULTIMEDIA COMMUNICATION BRIDGE

CROSS REFERENCE TO RELATED APPLICATIONS

This application is a continuation of U.S. application Ser. No. 15/876,902, filed Jan. 22, 2018, which is incorporated by reference in its entirety.

BACKGROUND

1. Field of Art

One or more embodiments of the disclosure generally relate to bridging of communications for different multimedia communication standards.

2. Description of the Related Art

As multimedia communication standards evolve, new features are added to newer versions of the standard. As a new standard is released, the implementation of a chip for a system is updated to implement the new features added to the newer version of the standard. Updating a system on chip (SoC) to implement new features of a newer release of a standard can be time consuming and expensive.

For example, the high-definition multimedia interface (HDMI) 2.1 standard includes features such as dynamic high-dynamic-range (D-HDR) that are not natively supported by the HDMI 2.0 standard. Since an SoC that was designed specifically for the HDMI 2.0 standard before the HDMI 2.1 standard was released does not implement the D-HDR feature, to implement the D-HDR feature compliant with the HDMI 2.1 standard, a new SoC is needed. This can be time consuming and may delay the release of HDMI 2.1 devices.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3A illustrates a data stream for a single frame of a video stream as defined in the HDMI 2.0 standard, according to one embodiment.

FIG. 4B illustrates a header of a VSIF packet in the first data stream, according to one embodiment.

FIG. 4C illustrates a header of a packet in the FAPA, according to one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

The new features added in the newer version of the standard are implemented using a bridge chip. The bridge chip interfaces with a SoC that is compliant with a first multimedia communication standard, and generates a data stream that is compliant with a second multimedia communication standard.

The bridge chip receives a first data stream compliant with the first multimedia communication standard. The first data stream includes first video data of a first incoming video frame, second video data of a second incoming video frame, and information describing a transfer function for the second video data, the information included in a video blanking interval of the first incoming video frame. The bridge chip extracts information describing a transfer function for the second video data. The bridge then generates a second data stream compliant with the second multimedia communication standard. The second data stream includes the first video data in a first outbound video frame, the second video data in a second outbound video frame, and the extracted information describing the transfer function for the second video data. Finally, the generated second data stream is transmitted to a destination device.

System Architecture

Figure 1:
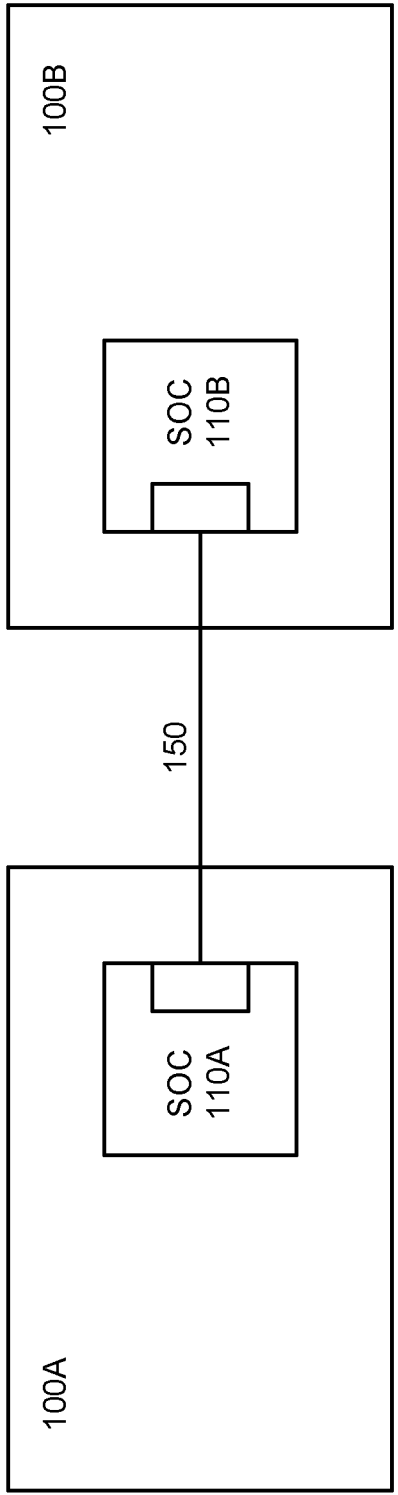
FIG. 1 illustrates a system architecture of a source device transmitting information using a predefined multimedia communication standard to a receiving device.

FIG. 1 illustrates a system architecture of a source device 100A transmitting information using a predefined multimedia communication standard to a receiving device 100B. The source device 100A and the receiving device 100B are connected to each other via a multimedia communication link 150. An example set-up using the system architecture shown in FIG. 1 is a Blu-ray player 100A communicating with a high-definition television (HDTV) 100B using a high-definition multimedia interface (HDMI) cable 150 using the HDMI 2.0b standard.

Each of the source device 100A and the receiving device 100B include a system-on-chip (SoC) 110 that is adapted for transmitting and receiving a stream of data encoded using the predefined multimedia communication standard.

Figure 2A:
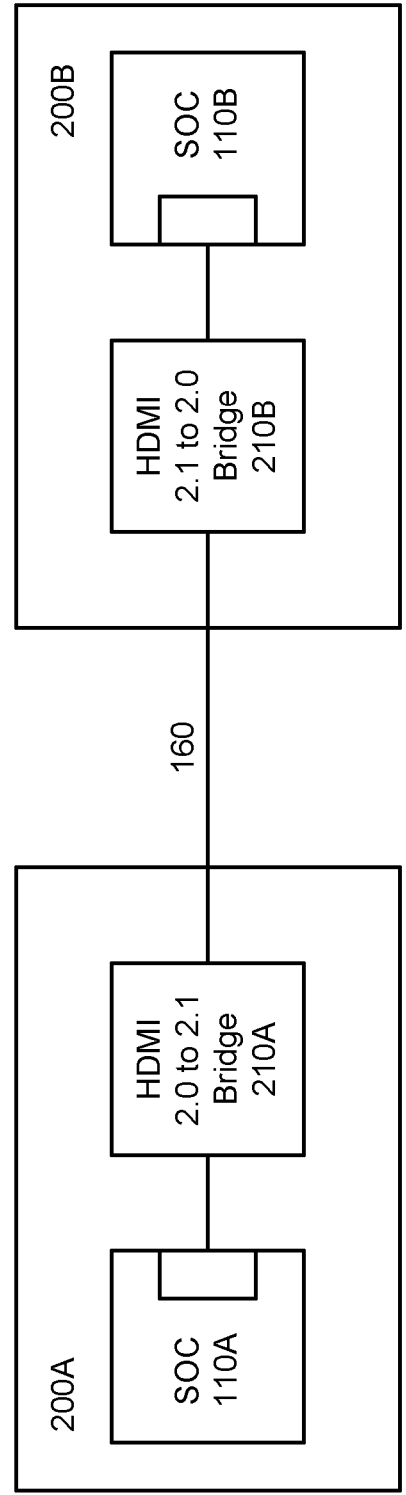
FIGS. 2A-2C illustrate a system architecture of a source device adapted to transmit information to a receiving device using a second multimedia communication standard, according to various embodiments.

FIG. 2A illustrates a system architecture of a source device 200A adapted to transmit information to a receiving device 200B using a second multimedia communication standard, according to one embodiment. The source device 200A and the receiving device 200B are connected to each other via a multimedia communication link 160. The source device 200A includes a SoC 110A and a bridge chip 210A. The SoC 110A is an IC chip configured to generate a data stream encoded with a first multimedia communication standard, different from the second multimedia communication standard. For instance, the SoC 110A generates and transmits a stream of data encoded with the HDMI 2.0b standard. The bridge chip 210A receives the data stream encoded with the first multimedia communication standard and re-encodes the data stream to be compliant with a second multimedia communication standard. For example, the bridge 210A receives a data stream encoded with the HDMI 2.0b standard and re-encodes the received data stream to be compliant with the HDMI 2.1 standard. HDMI 2.0b and 2.1 will be used as examples of different multimedia communication standards throughout the application. However, the principles described herein are applicable to other multimedia communication standards other than HDMI, such as DisplayPort or other standards.

The receiving device 200B includes a SoC 110B and a bridge chip 210B. The SoC 110B is configured to receive a data stream encoded with the first multimedia communication standard and execute a set of instructions based the received data stream. For example, the receiving device 200B may be a high-definition television (HDTV) and the SoC 110B is configured to receive a data stream encoded with the HDMI 2.0b standard, interpret the received data stream, and render images for display by a display panel of the HDTV. The bridge chip 210B receives a data stream encoded with the second multimedia communication standard and re-encodes the data stream using the first multimedia communication standard. That is, in the example of FIG. 2A, the bridge 210B re-encodes an HDMI 2.1 data stream into an HDMI 2.0 data stream.

Figure 2B:
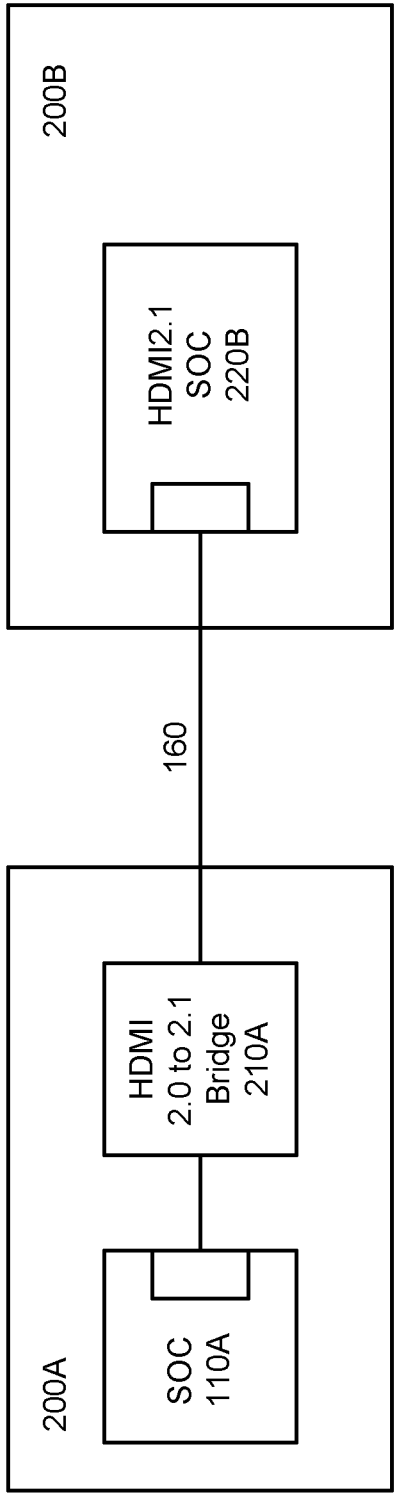
Figure 2C:
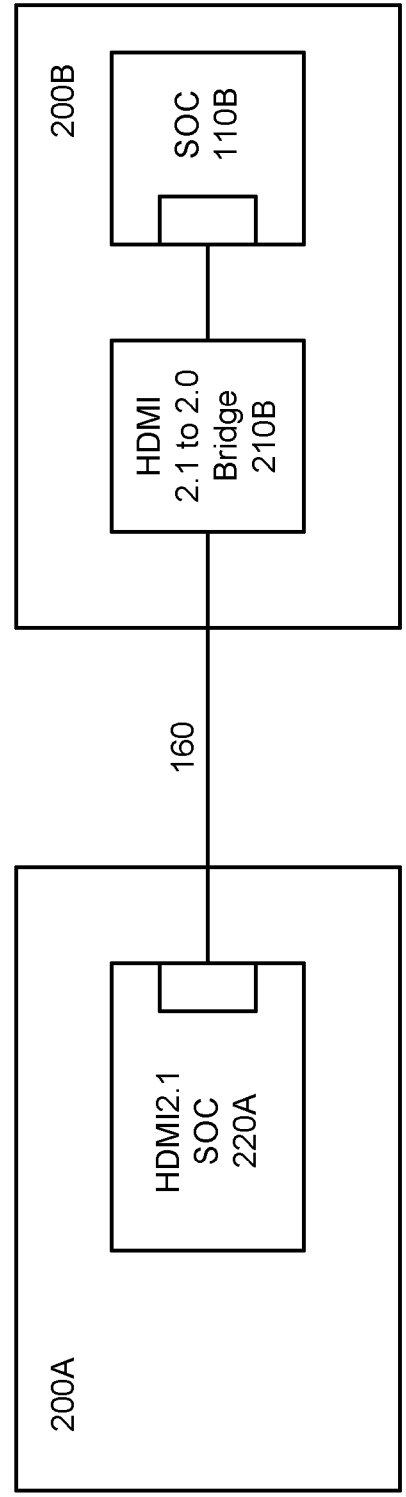

In some embodiments, as shown in FIG. 2B, the receiver device 200B includes an SoC 220B that is capable of natively processing data streams encoded with a protocol that is compliant with the second multimedia communication standard (e.g., HDMI 2.1). In this embodiment, the receiver device 200B does not have a bridge chip 210B coupled to the input of the SoC 220B. In other embodiments, as shown in FIG. 2C, the source device 200A includes an SoC 220A that is capable of natively transmitting a data stream encoded with a protocol that is compliant with the second multimedia communication standard (e.g., HDMI 2.1). In this embodiment, the source device 200A does not have a bridge chip 210A coupled to the output of the SoC 220A.

Video Frames in Multimedia Communication Standards

FIG. 3A illustrates a single video frame 300A of a video stream as defined in the HDMI 2.0 standard, according to one embodiment. The video frame includes an active video area 310, a vertical blanking interval (VBI or VBlank) 320, and a horizontal blanking interval (HBI or HBlank) 330.

The active video area 310 carries the video data to be displayed by a display panel of a display device (e.g., an HDTV). For instance, the active area includes video data for a 1920 by 1080 pixel array (2 k or full-HD resolution) using RGB or YUV encoding.

The vertical blanking interval (VBlank) 320 is the portion of the video frame that starts at the end of the final line of the active video area of a previous frame, and ends at the beginning of the first line of the active video area 310 of the video frame. In some embodiments, VBlank 320 includes a set number of lines (e.g., 90 lines). The horizontal blanking interval (HBlank) 330 is the portion of the data stream 300B corresponding to a video frame that is in between two lines of the active video period 310. In some embodiments, the HBlank 330 has a set width (e.g., data width equivalent to 560 pixels of color information).

The VBlank 320 and the HBlank 330 may include vendor specific infoframes (VSIF) 340, which are packets of data with a structure that is defined and used by different vendors designing electronics that implement that HDMI 2.0 standard. For instance, the VSIF 340 packets may include close captioning information for a video being transmitted via the HDMI data stream. A source device 100A may generate video frames that include multiple VSIF packets. A receiving device 100B connected to the source device may interpret the VSIF packets generated by the source device 100A or may ignore and discard the VSIF packets.

Figure 3B:
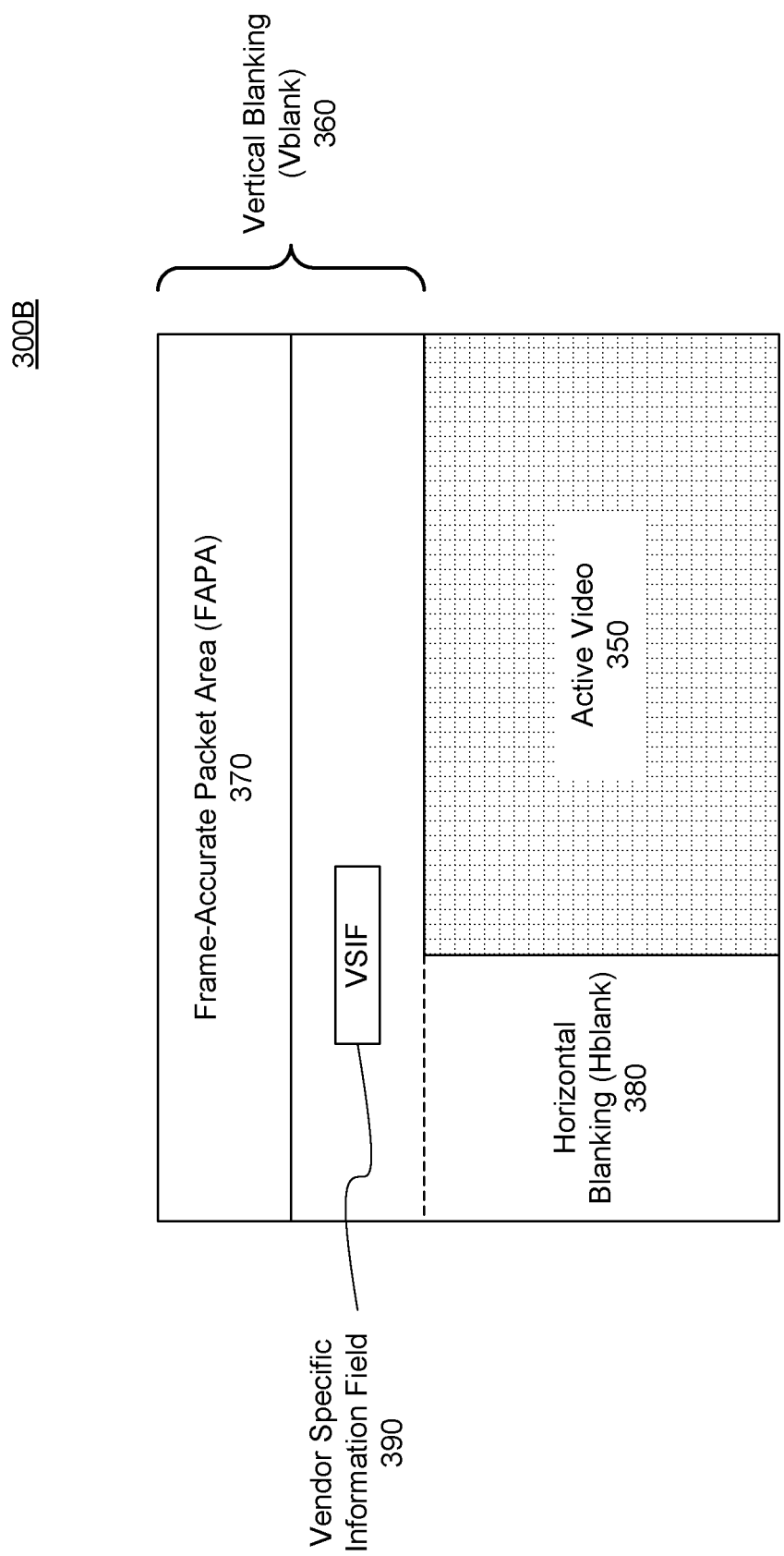
FIG. 3B illustrates a data stream for a single frame of a video stream as defined in the HDMI 2.1 standard, according to one embodiment.

FIG. 3B illustrates a single video frame 300B of a video stream as defined in the HDMI 2.1 standard, according to one embodiment. The video frame 300B includes an active video area 350, a vertical blanking interval (VBI or VBlank) 360 having a frame-accurate packet area (FAPA) 370, and a horizontal blanking interval (HBI or HBlank) 380.

The active video area 350 carries the video information to be displayed by a display panel of a display device (e.g., an HDTV). For instance, the active area includes data for a 3840 by 2160 pixels (4 k resolution) implemented in the sRGB color space at 10 bits per component (e.g., red, green, and blue components). That is, the active area includes 2160 lines of color data, each line including 3840 pixels of color data.

The vertical blanking interval (VBlank) 360 is the portion of the data stream 300B corresponding to a video frame that starts at the end of the final line of the active video area of a previous frame, and ends at the beginning of the first line of the active video area 310 of the video frame. In some embodiments, VBlank 360 includes a set number of lines (e.g., 90 lines).

VBlank 360 includes the frame-accurate packet area (FAPA) 370. The FAPA 370 starts at the beginning of the VBlank 360 and lasts for a set number of lines. In some embodiments, the number of lines of the FAPA 370 is $$\frac{VBlank}{2}, \text{ if } VBlank \text{ is even}$$

$$\frac{VBlank+1}{2}, \text{ if } VBlank \text{ is odd}$$

In some embodiments, the FAPA 370 is the portion of the video frame 300B where one or more extended metadata packet (EM) is transmitted. The EM packets include a 3-byte header and a payload of up to 28 bytes. The FAPA may be defined by HDMI 2.1 as a period of time during which EM packets can be transmitted.

The horizontal blanking interval (HBlank) 380 is the portion of the data stream 300B corresponding to a video frame that is in between two lines of the active area. In some embodiments, the HBlank 380 has a set width (e.g., data width equivalent to 560 pixels of color information).

In some embodiments, the second video stream 300B is transmitted at a faster bit-rate than the first video stream 300A. For example, the first video stream 300A is transmitted with a bit-rate of 18 Gbit/s as defined in the HDMI 2.0b standard, and the second video stream 300B is transmitted with a bit-rate of 40 Gbit/s or higher as defined in the HDMI 2.1 standard.

Multimedia Data Stream Re-Encoding

Figure 4A:
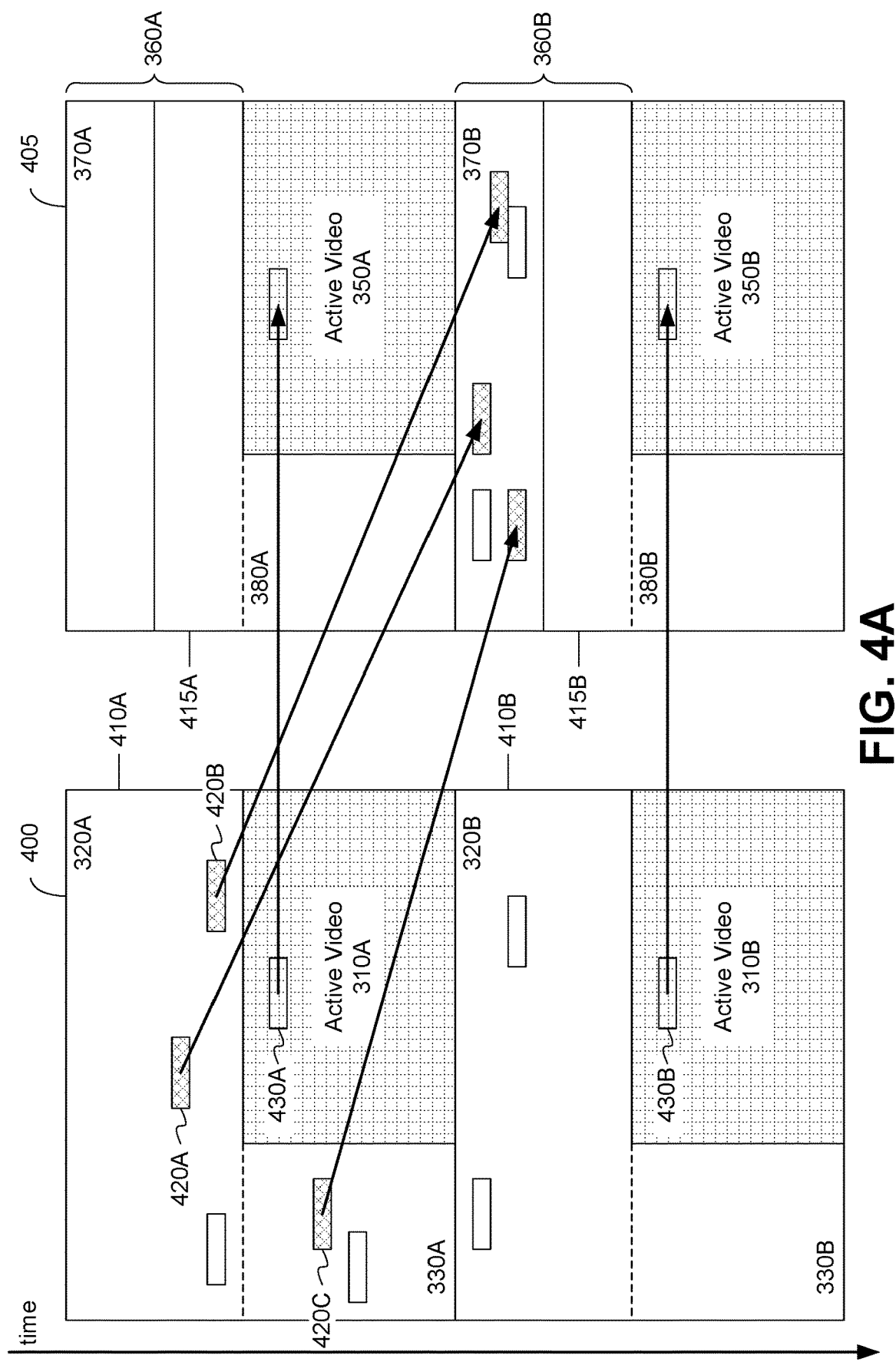
FIG. 4A illustrates a first data stream compliant with a first multimedia communication standard being re-encoded as a second data stream compliant with a second multimedia communication standard.

FIG. 4A illustrates a first data stream 410A compliant with a first multimedia communication standard being re-encoded as a second data stream 410B compliant with a second multimedia communication standard. For example, the first multimedia communication standard is the HDMI 2.0 standard and the second multimedia communication standard is the HDMI 2.1 standard.

The first data stream 400 includes two frames 410A and 410B. Each of the first frame 410A and second frame 410B include an active video area 310A and 310B respectively. The first frame 410A further includes VBlank and HBlank intervals that includes multiple VSIF 420A through 420C (collectively refer to as VSIF 420). The VSIF 420 includes information describing a transfer function for the video data included in the active video region 310B of the second frame 410B. For instance, the VSIF 420 of the first frame 410A of the first data stream 400 can include dynamic high-dynamic-range (D-HDR) metadata for the video data of the active video period 310B of the second video frame 410B of the first data stream 400. The D-HDR metadata can describe transfer functions used for color mapping of the video data from an 8 bit color space to a 10 bit color space. For example, the transfer function may be the S-Log3 Electro-Optical Transfer Function (EOTF), the ST 2084 Perceptual Quantizer (PQ) transfer function, or the Hybrid Log-Gamma (HLG) transfer function. In some embodiments, the information included in the VSIF 420 is not natively supported by the first multimedia communication standard, but is natively supported by the second multimedia communication standard. Since the information included in the VSIF 420 is not required to be supported by the first multimedia communication standard, if the source device 200A is connected to a receiving device 100B that supports the first multimedia communication standard, but does not support the second multimedia communication standard, the receiving device 100B may simply ignore the information included in the VSIF 420.

The information encoded in the first data stream 400 is re-encoded as the second data stream 405. The second data stream 405 includes two video frames 415A and 415B. The active video area 310A of the first frame 410A of the first data stream 400 is re-encoded in the active area 350A of the first frame 415A of the second data stream 405. The active area 310B of the second frame 410B of the first data stream 400 is re-encoded in the active area 350B of the second frame 415B of the second data stream 405. That is, a video packet 430A included in the active video area 310A of the first frame 410A of the first data stream 400 is included in the active video area 350A of the second frame 415A of the second data stream 405. In some embodiments, the position of the video packet 430A in the first frame 415A of the second data stream 405 is the same as the position of the video packet 430A in the first frame 410A of the first data stream 400. In other embodiments, the video packet in the second data stream 405 is delayed compared to the video packet in the first data stream 400.

The information encoded in the VSIF 420 included in the first frame 410A of the first data stream 400 is re-encoded and included in the FAPA 370B of the second frame 415B of the second data stream 405. Since the feature associated with the information encoded in the VSIF 420 is natively supported by the second multimedia communication standard, the information encoded in the VSIF 420 is re-encoded to comply with the specification of the second multimedia communication standard. In some embodiments, each of the VSIF packets 420A through 420C are re-encoded in a corresponding packet in the FAPA 370B of the second frame 415B of the second data stream 405. In other embodiments, the information encoded in the VSIF 420 is combined or split into a different number of packets in the FAPA 370B of the second frame 415B of the second data stream 405.

In some embodiments, the re-encoded information included in the FAPA 370 of the second data stream 405 has a predefined header. In one embodiment, the header of the packets in the FAPA 370 have a header that is different than the headers of the VSIF packets 420 in the first data stream 400. For instance, FIG. 4B illustrates a header of a VSIF packet 420 in the first data stream 400, and FIG. 4C illustrates a header of a packet in the FAPA 370, according to one embodiment.

The header of the VSIF packet 420 includes a first octate (HB0) that is programmed so by a designer of bridge 210. The first octate (HB0) can be used to identify the packets to be re-encoded in the FAPA 370 of the second data stream 405. The VSIF packet 420 further includes a second octate (HB1) identifying a version, and a third octate (HB2) the includes an identification whether the packet is the first packet of a series of packets, an identification whether the packet is the last packet of the series of packets, and a length field indicating the length of the VSIF packet 420.

The header of the packets in the FAPA 370 includes a first octate (HB0) that identifies a type of the packet. In the example of the FIG. 4C, the first octate has a value of 0x7F. The FAPA packet further includes a second octate indicating whether packet is the first packet or the last packet of a series of packets. The FAPA packet also includes a third octate (HB2) indicating a sequence index of the FAPA packet.

Since the information to be encoded in the second frame 415B of the second data stream 405 is included in the first frame 410A of the first data stream 400, the latency in generating and transmitting the second data stream is reduced. That is, the re-encoding or re-packetization of the information included in the VSIF 420 can be performed one frame in advance.

Moreover, the example of D-HDR being encoded in the VSIF 420 and the second data stream being an HDMI 2.1 stream, the re-encoding of the D-HDR packets into the FAPA 470 of the HDMI 2.1 data stream allows the D-HDR packet to be transferred in extended metadata packets (EM) as specified by the HDMI 2.1 standard.

Figure 5A:
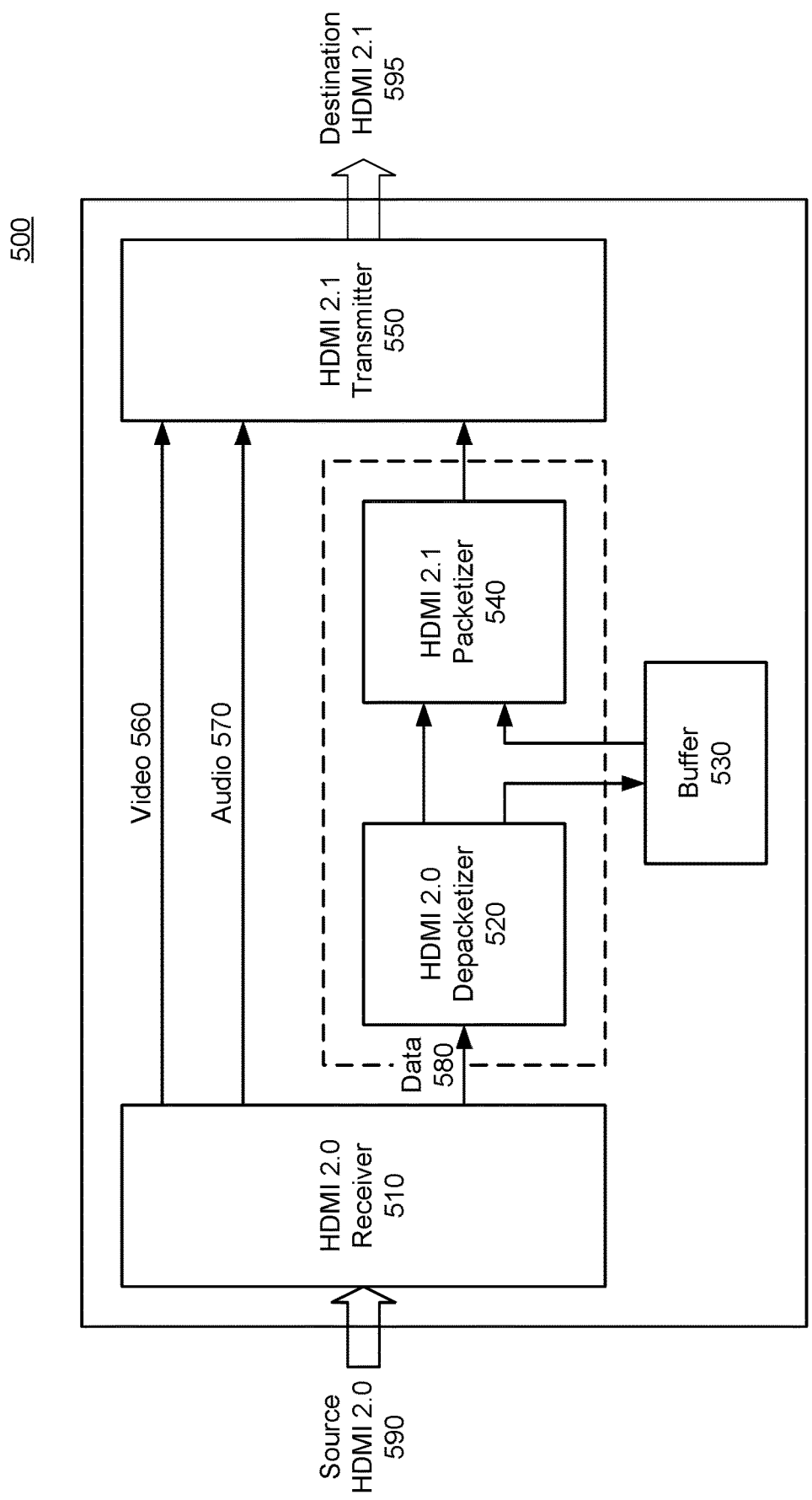
FIG. 5A illustrates a block diagram of a bridge circuit, according to one embodiment.

FIG. 5A illustrates a block diagram of a bridge circuit, according to one embodiment. The block diagram of FIG. 5A is configured to bridge between an HDMI 2.0 source signal and an HDMI 2.1 destination signal. The bridge circuit 500 includes a receiver circuit 510, a depacketizer circuit 520, a buffer circuit 530, a packetizer circuit 540, and a transmitter circuit 550.

The receiver circuit 510 receives a source data stream 590 encoded in a manner that is compliant with the first multimedia communication standard, and splits the data stream into each specific component included in the data stream, according to one embodiment. For instance, the receiver 510 receives a source HDMI 2.0 data stream, and splits the source data stream into a video component 560, and an audio component 570, and a data component 580.

The depacketizer 520 receives the data component 580 and decodes the data included in the data stream. In some embodiments, the depacketizer 520 identifies packets with specific properties and extracts the packets having the specific property. For instance, the depacketizer 520 identifies data packets in the data component 580 part of the data stream having specific values in the header portion of the packet. In one embodiment, the depacketizer extracts information describing a transfer function for a subsequent video frame from a video frame of a data stream. The depacketizer then stores the information included in the identified packets in the buffer 530. In some embodiments, other packets that are not stored in the buffer 530 are directly provided to the packetizer 540.

The buffer 530 stores data received from the depacketizer 520. In some embodiments, the buffer 530 is a static random-access memory (SRAM) module. In other embodiments, the buffer 530 is a register that is designed to store data for specific features that is supported by the second multimedia communication standard. For example, the buffer 530 can be designed to store D-HDR metadata.

The packetizer circuit 540 receives data stored in the buffer 530 and generates packets that are compliant with the second multimedia communication standard (e.g., HDMI 2.1 standard). The data stored in the buffer 530 that is received by the packetizer 540 was depacketized from a previous frame of the source data stream. In some embodiments, the packetizer 540 further receives data packets from the depacketizer 520 and generates packets that are compliant with the second multimedia communication standard. The data packets received from the depacketizer 520 were depacketized from the current frame of the source data stream.

The transmitter circuit 550 receives the video data 560 and the audio data 570 from the receiver 510 and the data packets from the packetizer 540, and generates a destination data stream 595 that is compliant with the second multimedia communication standard. For instance, the transmitter circuit 550 generates a destination data stream 595 that is compliant with the HDMI 2.1 standard. The transmitter circuit 550 can be an audio video mixer that mixes together the video, audio, and the packets from the packetizer circuit 540. The transmitter circuit 550 then transmits a data stream 595 encoded in a manner that is compliant with the second multimedia communication standard.

Figure 5B:
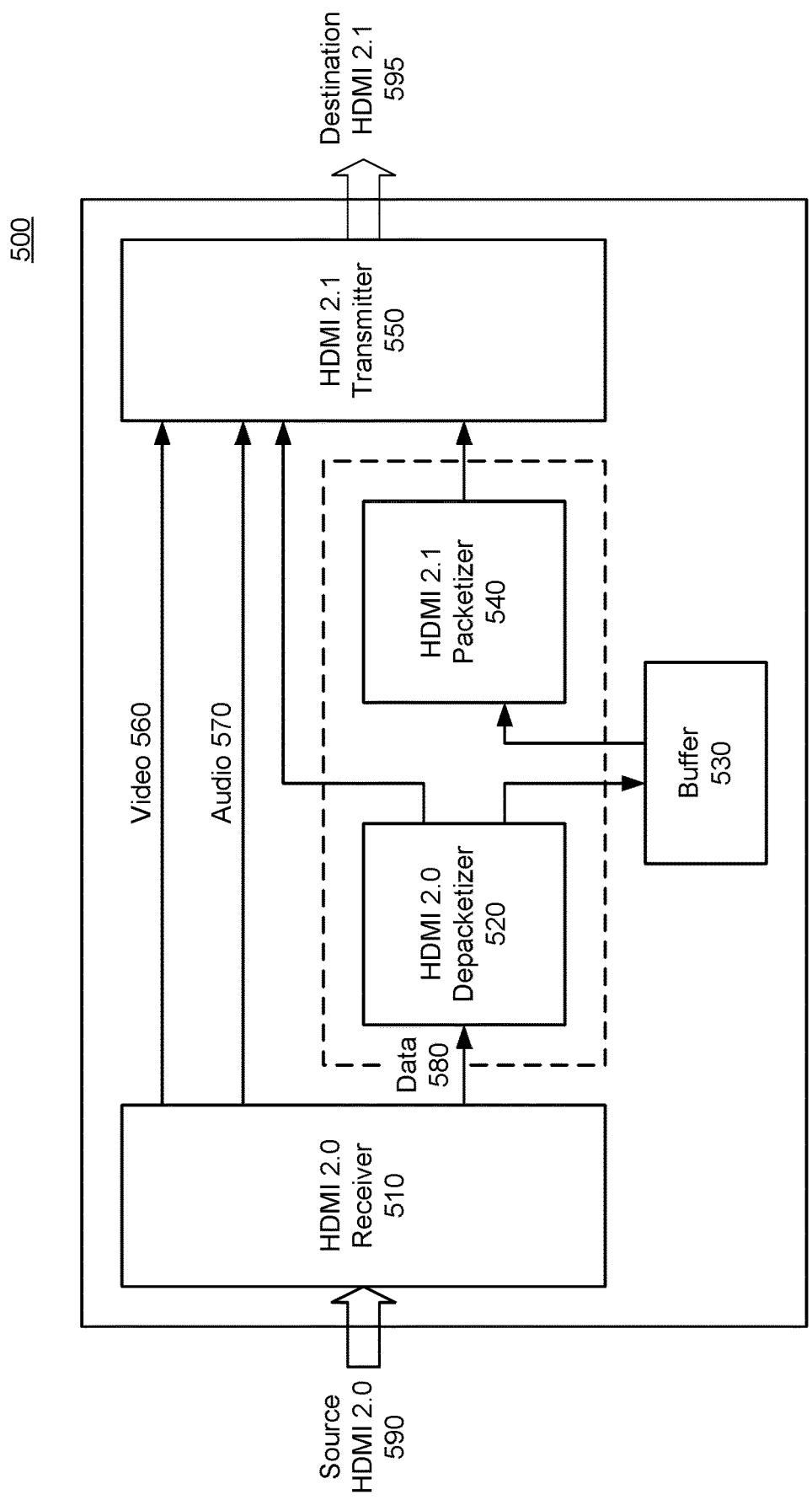
FIG. 5B illustrates a block diagram of a bridge circuit, according to one embodiment.

In some embodiments, as shown in FIG. 5B the transmitter circuit 550 receives the data components that are not stored in the buffer 530 directly from the depacketizer 520, instead of the packetizer 540. In this embodiment, the packetizer 540 generates packets that are to be delayed for one frame and provides the generated packets to the transmitter circuit 550 for generating the complete video frame.

Figure 6:
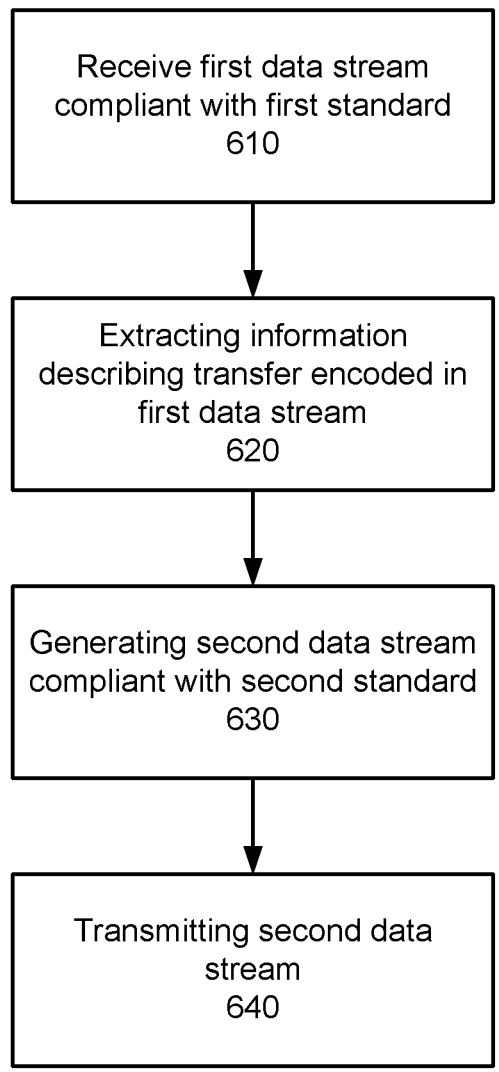
FIG. 6 illustrates a flow diagram of a process for converting a first data stream compliant with a first multimedia communication standard to a second data stream compliant with a second multimedia communication standard, according to one embodiment.

FIG. 6 illustrates a flow diagram of a process for converting a first data stream compliant with a first multimedia communication standard to a second data stream compliant with a second multimedia communication standard. A first data stream compliant with the first multimedia communication standard is received 610. The first data stream includes first video data of a first incoming video frame, second video data of a second incoming video frame, and information describing a transfer function for the second video data, the information included in a video blanking interval of the first incoming video frame.

The information describing the transfer function for the second video data is extracted 620 from the video blanking interval of the first incoming video frame. In some embodiments, the information describing the transfer function for the second video data is identified by identifying specific values in the header of packets included in the video blanking interval of the first frame.

A second data stream compliant with the second multimedia communication standard is generated 630. The second data stream includes the first video data in a first outbound video frame, the second video data in a second outbound video frame, and the extracted information describing the transfer function for the second video data in a video blanking interval of the second outbound video frame. Finally, the generated second data stream is transmitted 640 to a destination device.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation, and details of the method and apparatus disclosed herein without departing from the spirit and scope defined in the appended claims.

What is claimed is:

1. A device for converting a first data stream compliant with a first multimedia communication standard to a second data stream compliant with a second multimedia communication standard different from the first multimedia communication standard, wherein the first multimedia communication standard is a high-definition multimedia interface (HDMI) 2.0 standard, and the second multimedia communication standard is a HDMI 2.1 standard, the device comprising:
   a depacketizer circuit configured to extract data from a non-video area of a first incoming video frame of the first data stream compliant with the first multimedia communication standard;
   a buffer coupled to the depacketizer circuit, the buffer configured to receive the data extracted from the non-video area of the first incoming video frame and store the extracted data; and
   a transmitter coupled to the buffer, the transmitter configured to receive the stored data from the buffer delayed by at least one frame, and at least video data of a second incoming video frame of the first data stream, the transmitter configured to generate an outgoing video frame for the second data stream compliant with the second multimedia communication standard by combining the received video data of the second incoming video frame and the received extracted data from the non-video area of the first incoming video frame.

2. The device of claim 1, further comprising:
   a packetizer coupled in between the buffer and the transmitter, the packetizer configured to generate a data packet compliant with the second multimedia communication standard, the generated data packet including the data stored in the buffer.

3. The device of claim 2, wherein:
   the depacketizer is configured to identify one or more packets having a first predefined header in the non-video area of the first incoming video frame, and extract a payload from the identified one or more packets; and
   the packetizer is configured to generate one or more packets including the extracted data and a second predefined header, the second predefined header different than the first predefined header.

4. The device of claim 1, wherein the data extracted by the depacketizer from the non-video area of the first incoming video frame describes a transfer function for color information of the video data of the second incoming video frame.

5. The device of claim 4, wherein the transfer function corresponds to dynamic high-dynamic-range (D-HDR) data for the video data of the second incoming video frame.

6. The device of claim 4, wherein the transfer function includes one of an S-Log3 electro-optical transfer function (EOTF), a perceptual quantizer (PQ) transfer function, and a hybrid log-gamma (HLG) transfer function.

7. The device of claim 1, wherein the first and second data streams compliant with the first and second multimedia communication standards, respectively, are provided over wired connections.

8. The device of claim 1, wherein the data extracted by the depacketizer is a feature that is supported by the second multimedia communication standard and is not supported by the first multimedia communication standard.

9. The device of claim 1, wherein the extracted data is encoded in a vendor-specific infoframe (VSIF) of first incoming video frame of the first data stream.

10. The device of claim 1, wherein:
in the first data stream, the extracted data is included in a vertical blanking interval of the first incoming video frame that precedes first video data in the first incoming video frame, or the extracted data is included in a horizontal blanking interval of the first incoming video frame, and
in the second data stream, the extracted data is included in a vertical blanking interval of the outgoing video frame that precedes the video data of the second incoming video frame.

11. A method comprising:
receiving a first incoming video frame of a first data stream, the first incoming video frame compliant with a first multimedia communication standard, the first incoming video frame including first video data and first non-video data;
extracting at least a portion of the first non-video data from a non-video area of the first incoming video frame;
receiving a second incoming video frame of the first data stream, the second incoming video frame compliant with the first multimedia communication standard, the second incoming video frame including second video data and second non-video data; and
generating a second data stream compliant with a second multimedia communication standard different from the first multimedia communication standard, the second data stream including an outgoing video frame, the outgoing video frame including at least the second video data of the second incoming video frame and the extracted portion of the first non-video data of the first incoming video frame, wherein the first multimedia communication standard is a high-definition multimedia interface (HDMI) 2.0 standard, and the second multimedia communication standard is a HDMI 2.1 standard.

12. The method of claim 11, wherein extracting at least a portion of the first non-video data from the non-video area of the first incoming video frame comprises:
identifying one or more packets in the non-video area of the first incoming video frame having a first predefined header, and
extracting a payload from the identified one or more packets.

13. The method of claim 12, wherein generating a second data stream compliant with a second multimedia communication standard comprises:
generating one or more packets including the extracted portion of the first non-video data, the generated one or more packets having a second predefined header different than the first predefined header.

14. The method of claim 11, wherein the portion of the first non-video data extracted from the non-video area of the first incoming video frame is encoded in a vendor-specific infoframe (VSIF) of the first incoming video frame of the first data stream.

15. The method of claim 11, wherein:
in the first data stream, the extracted portion of the first non-video data is included in a vertical blanking interval of the first incoming video frame that precedes the first video data in the first incoming video frame, or the extracted portion of the first non-video data is included in a horizontal blanking interval of the first incoming video frame, and
in the second data stream, the extracted portion of the first non-video data is included in a vertical blanking interval of the outgoing video frame that precedes the second video data of the second incoming video frame.

16. The method of claim 11, wherein the portion of the first non-video data extracted from a non-video area of the first incoming video frame describes a transfer function for color information of the second video data of the second incoming video frame.

17. The method of claim 16, wherein the transfer function corresponds to dynamic high-dynamic-range (D-HDR) data for the video data of the second incoming video frame.

18. The method of claim 16, wherein the transfer function includes one of an S-Log3 electro-optical transfer function (EOTF), a perceptual quantizer (PQ) transfer function, and a hybrid log-gamma (HLG) transfer function.

19. The method of claim 11, wherein the first and second data streams compliant with the first and second multimedia communication standards, respectively, are provided over wired connections.

20. A method comprising:
receiving a first incoming video frame of a first data stream, the first incoming video frame compliant with a first multimedia communication standard, the first incoming video frame including first video data and first non-video data;
extracting at least a portion of the first non-video data from a non-video area of the first incoming video frame, wherein the extracting comprises:
identifying one or more packets in the non-video area of the first incoming video frame having a first predefined header, and
extracting a payload from the identified one or more packets;
receiving a second incoming video frame of the first data stream, the second incoming video frame compliant with the first multimedia communication standard, the second incoming video frame including second video data and second non-video data:
generating a second data stream compliant with a second multimedia communication standard different from the first multimedia communication standard, the second data stream including an outgoing video frame, the outgoing video frame including at least the second video data of the second incoming video frame and the extracted portion of the first non-video data of the first incoming video frame, wherein the generating comprises generating one or more packets including the extracted portion of the first non-video data, the generated one or more packets having a second predefined header different than the first predefined header; and wherein the first predefined header is not defined in the first multimedia communication standard, and the second predefined header is defined in the second multimedia communication standard, the second predefined header identifying a type of packet in a frame-accurate packet area of the outgoing video frame.

* * * * *

UNITED STATES PATENT AND TRADEMARK OFFICE
CERTIFICATE OF CORRECTION

| | |
|---|---|
| PATENT NO. | : 11,451,648 B2 |
| APPLICATION NO. | : 16/831818 |
| DATED | : September 20, 2022 |
| INVENTOR(S) | : Jiong Huang, Henry Tso and Hoon Choi |

It is certified that error appears in the above-identified patent and that said Letters Patent is hereby corrected as shown below:

In the Specification

In the Cross Reference to Related Applications:
In Column 1, Lines 6-7, change "application Ser. No." to --Application No.--.

Signed and Sealed this
Eighteenth Day of April, 2023

Katherine Kelly Vidal
*Director of the United States Patent and Trademark Office*